(12) United States Patent
Martin et al.

(10) Patent No.: US 10,611,056 B2
(45) Date of Patent: Apr. 7, 2020

(54) MACHINE AND PROCESS TO AUTOMATICALLY RECONFIGURE COMPOSITE TAPE AND FABRIC

(71) Applicant: Globe Machine Manufacturing Company, Tacoma, WA (US)

(72) Inventors: James P Martin, Troy, NY (US); Calvin Bamford, Jr., Tacoma, WA (US); Ronald M. Jacobsen, Puyallup, WA (US); Robert A. Law, III, Fircrest, WA (US)

(73) Assignee: Globe Machine Manufacturing Company, Tacoma, WA (US)

( * ) Notice: Subject to any disclaimer, the term of this patent is extended or adjusted under 35 U.S.C. 154(b) by 29 days.

(21) Appl. No.: 15/976,660

(22) Filed: May 10, 2018

(65) Prior Publication Data
US 2018/0326621 A1 Nov. 15, 2018

Related U.S. Application Data

(60) Provisional application No. 62/504,430, filed on May 10, 2017.

(51) Int. Cl.
*B29B 11/04* (2006.01)
*B29C 70/38* (2006.01)
(Continued)

(52) U.S. Cl.
CPC ............ *B29B 11/04* (2013.01); *B29B 11/16* (2013.01); *B29C 65/08* (2013.01); *B29C 65/745* (2013.01); *B29C 65/7802* (2013.01); *B29C 65/7894* (2013.01); *B29C 65/8253* (2013.01); *B29C 66/1122* (2013.01); *B29C 66/1142* (2013.01); *B29C 66/435* (2013.01);
(Continued)

(58) Field of Classification Search
CPC ... B29B 11/04; B29C 70/386; B29C 66/1122; B29C 65/7802; B65H 37/00
See application file for complete search history.

(56) References Cited

U.S. PATENT DOCUMENTS 4,055,455 A * 10/1977 McDonald ............. B21D 51/46
156/351
4,133,711 A * 1/1979 August ................. B29C 70/545
156/353
(Continued)

*Primary Examiner* — Mark A Osele
*Assistant Examiner* — Christopher C Caillouet
(74) *Attorney, Agent, or Firm* — Rowan TELS LLC

(57) ABSTRACT

A system to re-configure an input material into an output material includes an input material feeder reconfigurable to accept and feed an input material, an output material spooler, the input material feeder re-configurable relative to the material cutter to cut the input material at a re-configurable cut angle to produce a first intermediate cut section of material, a positioning and alignment system to position and align a leading edge of the first intermediate cut section of material with a trailing edge of a second intermediate cut section of material, a welder having a configurable position to weld the first intermediate cut section of material to the second intermediate cut section of material, and a control system comprising logic to set at least intensity of the welder, a contact pressure of the welder, temperature of the weld-table surface, and a tension applied by the output material spooler.

20 Claims, 14 Drawing Sheets

(51) Int. Cl.
*B65H 37/00* (2006.01)
*B65H 35/02* (2006.01)
*B65H 23/18* (2006.01)
*B29C 65/08* (2006.01)
*B29C 65/82* (2006.01)
*B29C 65/74* (2006.01)
*B29C 65/78* (2006.01)
*B29C 65/00* (2006.01)
*B29B 11/16* (2006.01)
*B65H 37/04* (2006.01)
*B65H 35/04* (2006.01)
*B29K 307/04* (2006.01)

(52) U.S. Cl.
CPC ........ *B29C 66/7212* (2013.01); *B29C 66/934* (2013.01); *B29C 66/9441* (2013.01); *B29C 66/9512* (2013.01); *B29C 70/386* (2013.01); *B65H 23/1806* (2013.01); *B65H 35/02* (2013.01); *B65H 35/04* (2013.01); *B65H 37/00* (2013.01); *B65H 37/04* (2013.01); *B29K 2307/04* (2013.01); *B65H 2301/51614* (2013.01); *B65H 2701/172* (2013.01); *B65H 2701/175* (2013.01); *B65H 2701/1742* (2013.01)

(56) References Cited

U.S. PATENT DOCUMENTS

| | | | | |
|---|---|---|---|---|
| 5,397,415 | A * | 3/1995 | Manabe | B26D 3/08 156/234 |
| 6,860,957 | B2 * | 3/2005 | Sana | B29C 70/386 156/245 |
| 2007/0056942 | A1 * | 3/2007 | Daniel | B23K 9/1062 219/125.1 |
| 2009/0008037 | A1 * | 1/2009 | Cina | B29C 66/1122 156/443 |

* cited by examiner

MACHINE AND PROCESS TO AUTOMATICALLY RECONFIGURE COMPOSITE TAPE AND FABRIC

CROSS-REFERENCE TO RELATED APPLICATIONS

This application claims benefit under 35 U.S.C. 119 to U.S. application Ser. No. 62/504,430, filed on May 10, 2017, which is incorporated herein by reference in its entirety.

BACKGROUND

Composite tapes and fabrics are used extensively in aerospace, automotive, industrial and other engineered composites applications. These composite materials include, for example, continuous fiber reinforced thermoplastic (CFRT) tapes and fabrics. These tapes and fabrics are typically comprised of continuous reinforcing fiber; e.g. carbon fiber or glass fiber, and may be pre-impregnated or semi-impregnated with a polymer matrix.

Pre-preg is "pre-impregnated" reinforcing fibers where a thermoplastic polymer matrix material; e.g. HDPE, PP, PA-6, PA, PPS, PEI, PEKK, PEEK, is already present. The fibers, in this case, are continuous, whether a unidirectional tape of a woven one, and the matrix is used to bond them together and to other components during manufacture. Semi-preg is a partially impregnated form of pre-preg. The proper final fiber and matrix proportions are present, but they have not been fully melt-consolidated to create a pre-preg. Semi-pregs tend to be more flexible that pre-pregs, facilitating forming post-processes, but may require additional heat-consolidation process steps to form final components. Semi-pregs may utilize thermoplastic polymer powders or films that are partially melted to the reinforcing fibers to stabilize them and enable automated handling and welding by the methods described herein.

Because the fiber is continuous and in one direction within the tape, the tape may be oriented flexibly in different layers to build up a laminated component that includes a variety of directional fibers optimized to a particular design criteria. The resulting laminate has highly specific characteristics due to the variety of fiber orientation throughout. Engineered solutions that could not otherwise be achieved by materials with homogeneous properties (e.g. metals, short fiber reinforced plastics) are thus realized by CFRT tape.

CFRT tape is an engineered composite material that enables the engineering of composite structure design, but is not easily converted to finished components. Continuous fiber, as opposed to long, short, chopped and other discontinuous forms, provides superior mechanical properties in an efficient form, thereby reducing the quantity of material utilized to meet a particular structural goal. Mass reduction of finished components is therefore often realized by utilizing continuous fiber in tape form.

The aerospace industry has evolved from wood and canvas, plywood (early composites), and metals to advanced composite materials. Manufacturing technology has matured more quickly for thermoset (epoxy) CFRT tape systems, while that of other composite tape materials has lagged behind. A common, although low-volume manufacturing method of utilizing continous CFRT tape is to melt-consolidate multiple layers together in a heated press system of some set configuration, including continuous systems, e.g. CCM (Continuous Compression Molding). The resulting melt-consolidated panel may have multiple nested parts cut from it, which are subsequently individually heated back up to melt, then compression molded or formed to a finished shape or geometry. This final part may then be overmolded with short-fiber reinforced or unreinforced thermoplastic to add fine details that do not require continuous fiber. Melt-consolidation, machining, compression molding, and overmolding are well understood in most cases and these processes have achieved a level of maturity. They do not address however, the bottleneck of feeding CFRT tape at high-volume into the consolidation process. Current manual practices and machines cannot be scaled for high-volume production.

Similar to the aerospace industry, automotive and industrial applications are advancing in composite materials adoption. CFRT tape formatting processes and downstream conversion processes (lamination and consolidation) offer a step-change toward replacing metallic structure with composite structure. Engineered component designs utilizing CFRT tape enable the optimized structures for strength, crash-safety, and mass reduction of systems throughout the vehicle platform.

CFRT tape products from multiple suppliers have matured to a level of quality that allows for automation of manufacturing processes that convert the incumbent form of these materials into ones that allow for higher volume and quality manufacturing of finished goods. This improved material quality, industry awareness of utilization of these materials, overall growth and maturity of composite materials in a variety of applications, are all creating the need for specific forms of materials to enable widespread adoption. Slow, manual methods used to make these materials today lead to worker injury, limited production, inconsistent quality, and the lack of advancement of downstream automated manufacturing processes.

A need therefore exists for a more automated, safer, higher-throughput process of manufacturing high quality rolls of oriented fiber CFRT tape as well as for other composite material tapes, for use as feedstock to high-volume lamination and consolidation processes.

BRIEF SUMMARY

Disclosed herein are embodiments of a machine and process to automatically unwind, cut, orient, edge-weld, tension, and wind-up CFRT tape into useful re-configurations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
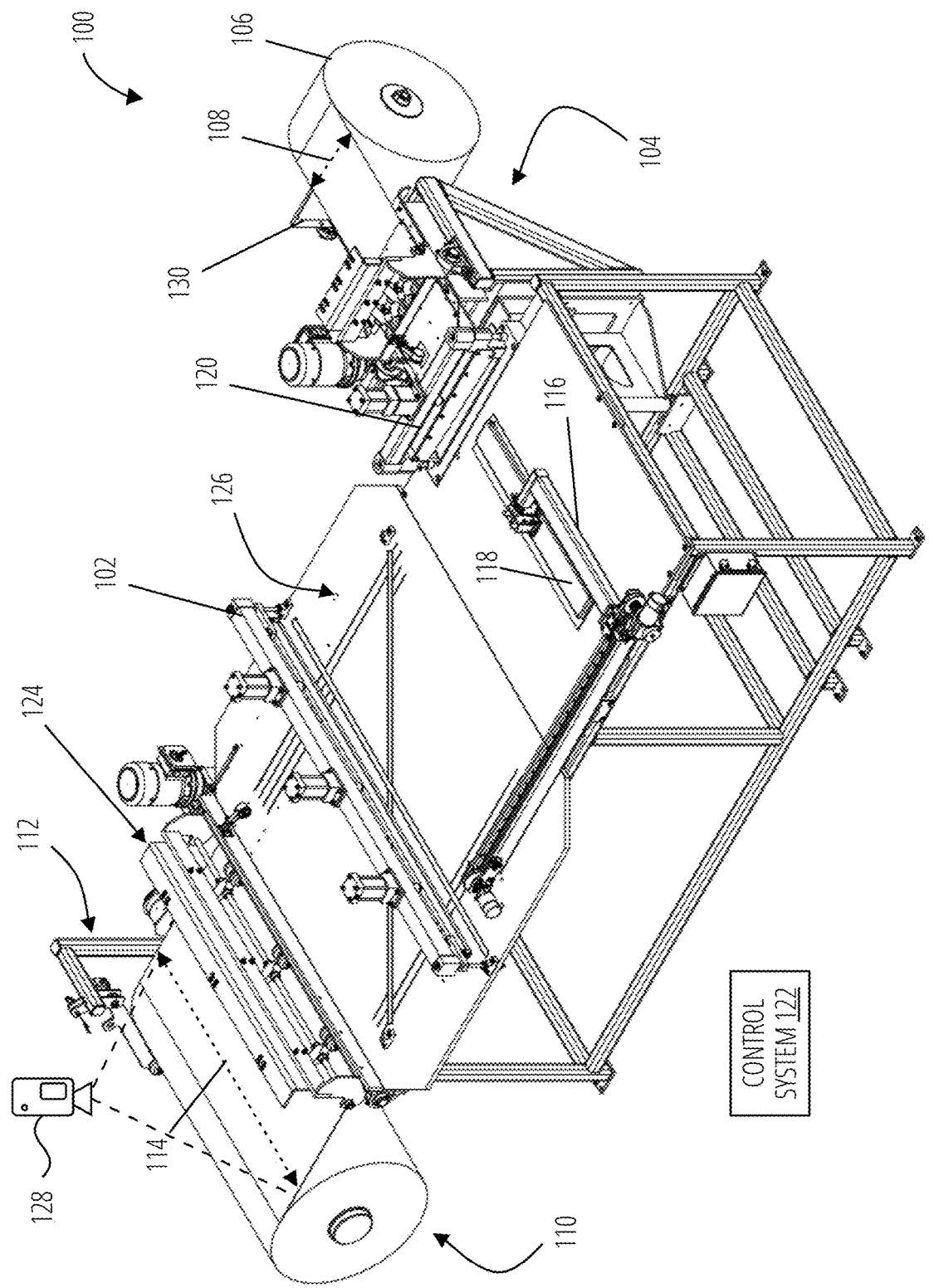
FIG. 1 illustrates an embodiment of a system 100 to re-configure an input material into an output material.

"Configurable tensioning mechanism" herein refers to a mechanism for spooling reconfigured fiberous tape at a defined tension. Example of configurable tensioning mechanisms are: pulley tensioners adjusting distance and angle of an interfacing surface to other contacting points; resistance roller applying resistance to an interfacing surface moving across the roller; friction disk brakes actuated manually or automatically;

"Control system" herein refers to logic to generate or retrieve control signals for operating system components from inputs received or detected by the system. An example of a software implementation of a control system for setting welding temperature is: IF(materialSpec:table.weldingProtocol=match && outSpec:weldingProtocol.weldPhase=match) GET weldPhase (weldTemp, weldDuration) SEND control.weldTemp && control.weldDuration TO welder.systemComponent; An example of a software implementation of a control system for setting the cooling temperatuere is: IF(materialSpec:table.weldingProtocol=match && outSpec:weldingProtocol.coolingPhase=match) GET coolingPhase (coolTemp, coolDuration) SEND control.coolTemp && control.coolDuration TO welder.systemComponent; An example of a software implementation of a control system for setting a contact pressure is: IF(materialSpec:table.weldingProtocol=match && outSpec:weldingProtocol.contactPressure=match) GET contactPressure SEND control.contactPressure TO welder.systemComponent; An example of a software implementation of a control system for setting the tension for operating an output spooler is: IF(inputMaterialSpec=input1, outputMaterialSpec=input2, outputSpoolStatus=input3) tensioning.algorithm(input1, input2, input3)=control.tension, SEND control.tension TO tensioningMech.systemComponent;

"Force-feedback mechanism" herein refers to a mechanism for detecting resistance or a change in applied force due to external factors in a mechanical system. Examples of force feedback mechanisms are: voltage sensors relaying change in resistance to an electric motor, an accelerometers detecting and relaying changes in acceleration, pressure sensors detecting changes in an applied force.

Disclosed herein is a programmable, computer controlled machine system for automatically coordinated conversion of an input material or fabric to re-configured output material or fabric. Examples of an input material that the system may operate on may include continuous fiber reinforced thermoplastic (CFRT) tapes such as carbon fiber tape, glass fiber tape, and aramid fiber tape, or fabric (woven fibrous material); any of which may be semi impregnated (semi-preg) or fully impregnated (pre-preg) with a thermoplastic polymer matrix. At a high level, the system may utilize one or more programmable logic controller (PLC), a panel HMI for the operator interface, and various motors, pneumatic actuators, vacuum systems, and sensors to monitor, control, and provide specific functions throughout the process.

For CFRT tape and other composite material (e.g., semi-preg and pre-preg fabrics and unidirectional tapes, etc.), hereinafter referred to as the input material, the system provides automatic unwinding, feeding, cutting, positioning of cut pieces to orient fiber at a predetermined angle, and thermally edge welding ("seaming") the leading edge of a new piece to the trailing edge of a prior positioned piece, with consistent proximity and intimate contact of edges. Herein, "welding" refers to the application of heat to melt the intrinsic polymer of the tape to flow and harden into an adjacent seam.

The system thereafter applies consistent tension to wind-up the re-configured material, to test and ensure the quality of the weld and constituent material(s), as the newly oriented input material is wound up onto a roll for utilization as feedstock by downstream manufacturing processes. The system is capable of "butt-welding" the material edges, an industry term for a weld with no overlap of the edges. Alternatively the system is able to "lap-weld" the material edges, creating an overlap of the tapes prior to welding.

Additionally, an automatic machine system is capable of producing continuous welds or step-welds of two or more CFRT tapes side-by-side, as they are unwound, aligned, welded, tensioned and wound-up, to increase the width of the output material relative to the input material by an integer number of input material widths.

In overview of one embodiment, a roll or rolls of input material are loaded at an unwind spool holder station. An operator feeds, clamps, and cuts the material to initialize a manufacturing cycle. The system steps through the feed, cut, orient, position, and weld cycle until the leading edge of the oriented, welded material is positioned to attached at the wind-up spool. The operator may step the system through this initial phase. Once the material is attached at the wind-up spool, the system is run continuously and automatically to produce the re-configured output material.

In some embodiments, a leader material may be used to clamp top the leading edge of the first piece of oriented, welded material immediately after the weld station. This leader material is attached to the wind-up spool in order to initiate the continuous, automatic system function sooner in the process.

The system precisely aligns and positions the edges of the input material at the weld location such that the edges are in intimate contact, with some planar preload on the seam, without overlapping. This criteria for a true "butt-weld", as defined by the industry, is essential for certain applications, most notably in the aerospace market.

The system may incorporate one or more 2D or 3D machine vision or scanning systems to monitor for defects in the input material as well as the re-configured, welded output material prior to wind-up of the output material on the output spool.

In some embodiments, the coatings and materials applied to the weld may be improved or changed based on the characteristics of certain continous fiber tape products.

In more detail, an embodiment of a process for re-configuration of an input material having a colinear fiber orientation along the length of the input material, and having a first width, into an output material having one or both of a non-colinear orientation along the tape length or second width different than the first width is as follows:

1. Load the input material as described above.
2. Pull input material into unspooling feeder (e.g., a pinch roller)
3. Configure the system for the desired output material configuration. Angle cuts may be configured by pivoting the material feeder. The welding bar may be oriented for the configured cut.
4. Feed cut piece to layout area, using for example a slip-clutch system to precisely position the cut piece abutted to prior piece of material (to "feel" when the edges are precisely abutted). Engage a vacuum to secure the pieces down to the welding table to maintain the precise position.
5. Engage an electric heating element (e.g., the weld bar) positioned above the table, applying precisely controlled downward force (e.g., specific to the materials) and temperature (e.g., also specific to the materials), and active cooling (air or water) to contact weld the seam formed at the cut.
6. Modulate heating and cooling of the weld bar (specific to the materials and the weld properties required for the output material), and withdraw the weld bar. This may leave an indent at the seam, the properties of which are controllable as described above. How much to cool the weld bar before moving weld bar away from the seam is a process parameter.
7. Feed the welded parts to a take-up spool, continuously applying and modulating the tension on the output material based on the desired mechanical strength of the output material. This tests both the integrity of the weld and the quality of the component tape sections within the output material. The tension applied to the output material is further modulated according to the diameter of output material already accumulated on the output spool.

A system to re-configure an input material into an output material includes an input material feeder reconfigurable to accept and feed an input material having a first width, the input material feeder comprising a first configurable tensioning mechanism, an output material spooler reconfigurable to accept and feed the output material, the output material having a second width the same as, smaller, or larger than the first width, the output material spooler comprising a second configurable tensioning mechanism, a material cutter positioned between the input material feeder and the output material spooler, the input material feeder re-configurable relative to the material cutter to cut the input material at a re-configurable cut angle to produce a first intermediate cut section of material, a positioning and alignment system to position and align a leading edge of the first intermediate cut section of material with a trailing edge of a second intermediate cut section of material, the second intermediate cut section of material cut immediately prior to the first intermediate cut section of material, a welder having a configurable position to weld the first intermediate cut section of material to the second intermediate cut section of material, a weld-table surface configured to control cooling immediately beneath the welder, and a control system comprising logic to set at least intensitiy of the welder, a contact pressure of the welder, temperature of the weld-table surface, and a tension applied by the output material spooler.

In the system, the welder may be configured as a thermal welder or an ultrasonic welder. The thermal welder may be utilized to perform butt welds or lap welds, while the ultrasonic welder may be utilized to perform the lap welds. The different welders may be swapped or replaced in accordance to the material material or process specifications. The input material may be a continuous fiber reinforced thermoplastic (CFRT) tape, or a semi-preg/pre-preg fabric. The system may include a quality monitoring device comprising one or more of machine vision, optical scanning, and transducers to monitor a quality of the output material and to detect defects in the output material. In some configurations, the control system may include logic to set one or more of an intensity of the welder, a duration of cooling of the welder, a duration of weld contact of the thermal welder, and a process line rate for conversion of the input material to the output material. Furthermore, the control system may include logic to set an algorithm for interpreting quality control readings from the quality monitoring device. Additionally, the input material feeder and material cutter being distinct and separable from the positioning and alignment system, the welder, and the output material spooler.

A system to re-configure an input material into an output material may include an input material feeder reconfigurable to accept and feed an input material having a first width, the input material feeder may include a first configurable tensioning mechanism, an output material spooler reconfigurable to accept and feed the output material, the output material having a second width the same as, smaller, or larger than the first width, the output material spooler may include a second configurable tensioning mechanism, a material cutter positioned between the input material feeder and the output material spooler, the input material feeder re-configurable relative to the material cutter to cut the input material at a re-configurable cut angle to produce a first intermediate cut section of material, a positioning and alignment system to position and align a leading edge of the first intermediate cut section of material with a trailing edge of a second intermediate cut section of material, the second intermediate cut section of material cut immediately prior to the first intermediate cut section of material, a welder having a configurable position to weld the first intermediate cut section of material to the second intermediate cut section of material, a weld-table surface configured to control cooling immediately beneath the welder, and a control system may include logic to set at least intensitiy of the welder, a contact pressure of the welder, temperature of the weld-table surface, and a tension applied by the output material spooler. In some configurations, the welder may be a thermal welder or an ultrasonic welder. The input material may be a continuous fiber reinforced thermoplastic (CFRT) tape or a semi-preg or pre-preg fabric. The system may include a quality monitoring device may include one or more of machine vision, optical scanning, and transducers to monitor a quality of the output material and to detect defects in the output material. The control system may include logic to set an algorithm for interpreting quality control readings from the quality monitoring device. The control system may also inlcude logic to set one or more of an intensity of the welder, a duration of cooling of the welder, a duration of weld contact of the welder, and a process line rate for conversion of the input material to the output material. Furthermore, the input material feeder and material cutter may be distinct and separable from the positioning and alignment system, the welder, and the output material spooler.

A system to re-configure an input material into an output material utilizing a butt weld includes an input material feeder reconfigurable to accept and feed an input material having a first width, the input material spooler may include a first configurable tensioning mechanism, an output material spooler reconfigurable to accept and feed the output material, the output material having a second width the same as, smaller, or larger than the first width, the output material spooler may include a second configurable tensioning mechanism, a material cutter positioned between the input material feeder and the output material spooler, the input material feeder re-configurable relative to the material cutter to cut the input material at a re-configurable cut angle to produce a first intermediate cut section of material, a positioning and alignment system to position and align a leading edge of the first intermediate cut section of material with a trailing edge of a second intermediate cut section of material, the second intermediate cut section of material cut immediately prior to the first intermediate cut section of material, the positioning and alignment system may include a force-feedback mechanism to precisely set a contact pressure between an edge of the first intermediate cut section of material and an edge of the second intermediate cut section of material, a thermal welder having a configurable position to weld the first intermediate cut section of material to the second intermediate cut section of material along the cut angle; a weld-table surface configured to control cooling immediately beneath the thermal welder, and a control system may include logic to set at least a heating and cooling temperature of the thermal welder, a contact pressure of the thermal welder, temperature of the weld-table surface, and a tension applied by the output material spooler. In the butt weld configurations of the system, the input material may be a CFRT tape.

The system utilizing a butt weld to join the input material may include a quality monitoring device may include one or more of machine vision, optical scanning, and transducers to monitor a quality of the output material and to detect defects in the output material. The control system further may include logic to set an algorithm for interpreting quality control readings from the quality monitoring device. The control system may also include logic to set one or more of a duration of heating the thermal welder, a duration of cooling of the thermal welder, a duration of weld contact of the thermal welder, and a process line rate for conversion of the input material to the output material. The input material feeder and material cutter may be distinct and separable from the positioning and alignment system, the thermal welder, and the output material spooler.

A system to re-configure an input material into an output material utilizing a lap weld may include an input material feeder reconfigurable to accept and feed the input material having a first width, the input material spooler may include a first configurable tensioning mechanism, an output material spooler reconfigurable to accept and feed the output material, the output material having a second width the same as, smaller, or larger than the first width, the output material spooler may include a second configurable tensioning mechanism, a material cutter positioned between the input material feeder and the output material spooler, the input material feeder re-configurable relative to the material cutter to cut the input material at a re-configurable cut angle to produce a first intermediate cut section of material, a positioning and alignment system to position and align a leading edge of the first intermediate cut section of material to overlap the trailing edge of a second intermediate cut section of material, the second intermediate cut section of material cut immediately prior to the first intermediate cut section of material, the positioning and alignment system may include an overlap mechanism, with a programmable overlap position, to raise and move the leading edge of the first intermediate cut section of material over the trailing edge of the second intermediate cut section of material to a precisely set travel distance between an edge of the first intermediate cut section of material and an edge of the second intermediate cut section of material, a welder having a configurable position to weld the first intermediate cut section of material to the second intermediate cut section of material, a holder mechanism to hold the overlap of first intermediate cut section of material with the second intermediate cut section of material in place in precise position and orientation while they are may be welded, a weld-table surface configured to control cooling immediately beneath the welder, and a control system may include logic to set at least intensitiy of the welder, a contact pressure of the welder, temperature of the weld-table surface, and a tension applied by the output material spooler.

In the system configured to perform a lap weld, the input material feeder, material cutter, and first configurable tensioning mechanism may be distinct and separable from the positioning and alignment system, the holder mechanism, the weld-table surface, the welder, and the output material spooler. The holder mechanism may be integrated into the positioning and alignment system and retains the first intermediate cut section of material in place while the welder joins the overlap of the first intermediate cut section of material and the second intermediate cut section of material. The input material may be a continuous fiber reinforced thermoplastic (CFRT) tape or a semi-preg or pre-preg fabric. The system may also include a quality monitoring device may include one or more of machine vision, optical scanning, and transducers to monitor a quality of the output material and to detect defects in the output material. The control system may also include logic to set an algorithm for interpreting quality control readings from the quality monitoring device.

In the system configured to perform a lap weld, the welder may be an ultrasonic welder having a configurable position to weld the first intermediate cut section of material to the second intermediate cut section of material along overlap between the leading edge of the first intermediate cut section of material and the trailing edge of the second intermediate cut section of material. The control system may also include logic to set at least a frequency for the ultrasonic welder, a contact pressure of the ultrasonic welder, temperature of the weld-table surface, and a tension applied by the output material spooler. The control system may also include logic to set one or more duration of applied frequencies for the ultrasonic welder, a duration of weld contact of the ultrasonic welder, and a process line rate for conversion of the input material to the output material.

In the system configured to perform a lap weld, the welder may be a thermal welder having a configurable position to weld the first intermediate cut section of material to the second intermediate cut section of material along overlap between the leading edge of the first intermediate cut section of material and the trailing edge of the second intermediate cut section of material. The control system may also include logic to set at least a heating and cooling temperature of the thermal welder, a contact pressure of the thermal welder, temperature of the weld-table surface, and a tension applied by the output material spooler. The control system may also include logic to set one or more of a duration of heating the thermal welder, a duration of cooling of the thermal welder, a duration of weld contact of the thermal welder, and a process line rate for conversion of the input material to the output material.

In some configurations, the positioning and alignment system as well as the vacuum table surface may utilize the same or different types of vacuum systems in order to move and retain the cut pieces of material. Due to the porosity of the different types of material, the vacuum engagement to the surface may not be possible. In order to allow for the movement of the cut pieces of material a different vacuum system may be utilized to move different types of input material. These systems may utilize a Bernoulli Effect vacuum cup instead of a traditional vacuum system to for holding materials.

In some configurations, large lap welds for certain material may specifically require the use of an ultrasonic weld cycle. In some configurations, tension may be utilized to test tension to test the quality and the roll of material. The pulling and constant tension of the material of the welded product by the tensioning mechanisms of the output spooler may function as the quality test for the strength of the weld. In some configurations, the system may be implemented to create complimentary rolls of off angle fibers for utilization in aerospace parts. In some configurations, the system may be configured such that the blades of the cutters may be easily removed and replaced. In additional configurations the entire cutting mechanism may be easily removed or replaced from the rest of the system to allow for facilitated maintenance. In some configurations, the control system may be accomplished by a programmable logic controller that would allow for the capture of process parameters that may be stored as part of a larger data set and used in conjunction with the material tracking as a way to identify events related to the quality of the output material. These may include aspects such as the duration and temperature of the weld (thermal welder) or frequency and duration of the weld (ultrasonic welder). Furthermore the system may be utilized to identify problems as soon as a manufacturing event is detected such as the failure or incomplete formation of a weld. This event tracking may be useful in determining maintenance frequencies for the system according to particular welding parameters for particular tapes. In some instances the input material may come with a scannable code (QR code label) to help the tracking of the output material.

Referencing FIG. 1, a system 100 to re-configure an input material into an output material includes a welder 102, an input material feeder 104, an output material spooler 110, a positioning and alignment system 116, a force-feedback mechanism 118, a material cutter 120, a control system 122, a zoned vacuum hold-down table 126, and a weld material wind up and weld positioner 124. The control system 122 may optionally include a quality monitoring device 128 such as a machine vision system, optical scanner, or other sensors/transducers to monitor a quality of the output material and to detect defects in the output material.

The input material feeder 104 comprises a first configurable tensioning mechanism 130, and receives an input material 106 having a first width 108. The output material spooler 110 comprises a second configurable tensioning mechanism 112, and collects an output material having a second width 114.

In some implementations, the input material feeder 104 and material cutter 120 may be operated faster than the other components of the system. In these situations, one or a few material feeder 104 and material cutter 120 combinations may be operated to fill a queue or bin with cut sections of material, and these supplied to multiple stations (a larger number than for the number of input material feeder 104/material cutter 120 stations) comprising the other components of the system (an output material spooler 110, a positioning and alignment system 116, a force-feedback mechanism 118, a material cutter 120, a control system 122, a zoned vacuum hold-down table 126, a weld material wind up and weld positioner 124, etc.)

The system 100 may be operated in accordance with the process described in FIG. 2-FIG. 4, and FIG. 10-FIG. 13.

Figure 2:
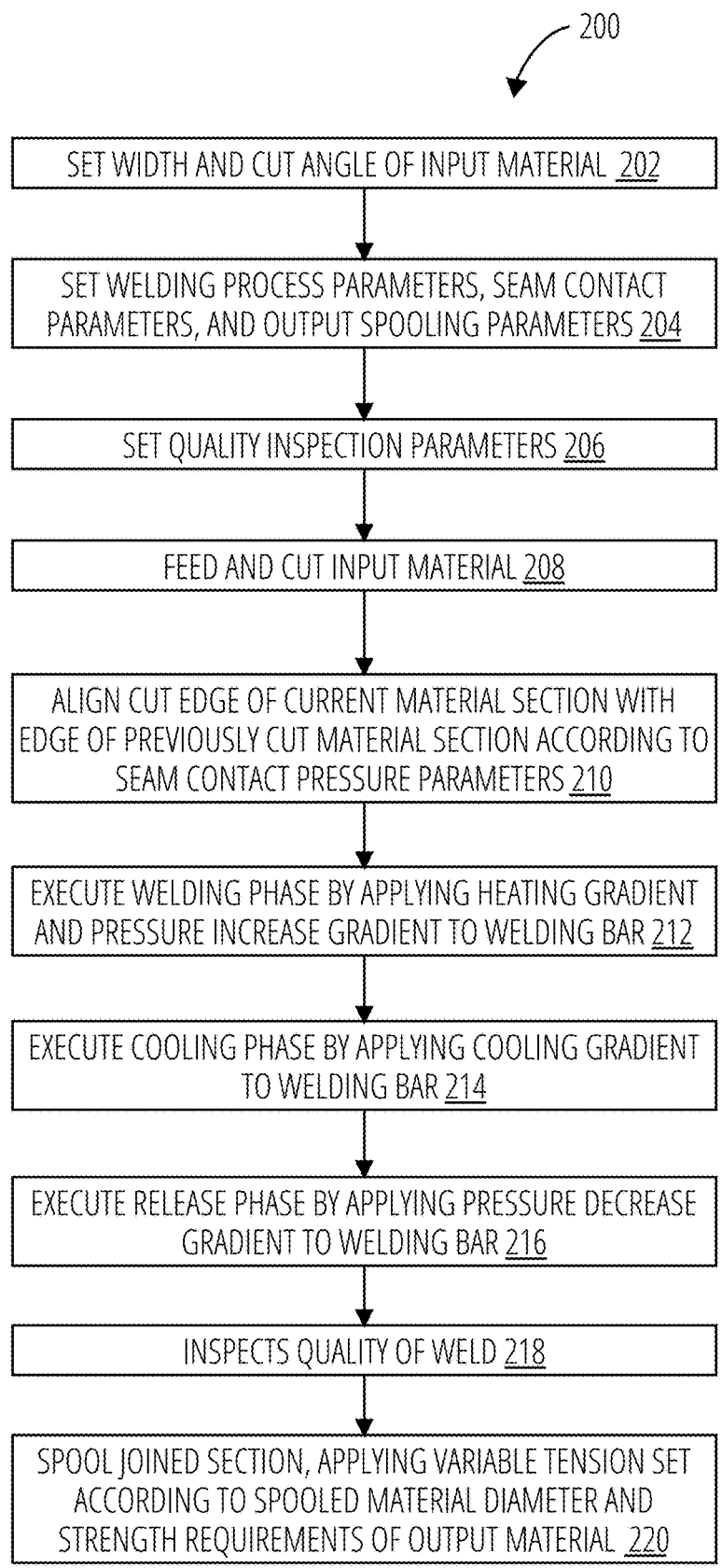
FIG. 2 illustrates an embodiment of a process 200 of operating a control system.

Referencing FIG. 2, a process 200 of operating a control system involves setting the width of the cut angle of the input material for the input material feeder (block 202). In block 204, the process 200 sets welding process parameters and seam contact parameters for the welding bar, and output spooling parameters for the output material spooler. In block 206, the process 200 sets quality inspection parameters, to configure the control system 122 on how to interpret readings from the quality monitoring device 128, and in some embodiments to set an algorithm for quality control/inspection according to quality control settings for the particular process.

In block 208, the process 200 feeds and cuts input material through operation of the material cutter. In block 210, the process 200 aligns the cut edge of current material section with edge of previously cut material section according to the seam contact pressure parameters.

In block 212, the process 200 executes a welding phase by applying a heating gradient and a pressure increase gradient to welding bar. In block 214, the process 200 executes a cooling phase by applying a cooling gradient to welding bar. In block 216, the process 200 executes a release phase by applying a pressure decreasing gradient to welding bar.

In block 218, the process 200 inspects the quality of the weld. In block 220, the process 200 spools the joined sections together through the output material spooler and applies a variable tension set according to the spooled material diameter and the strength requirements of output material through operation of the configurable tensioning mechanism.

Figure 3:
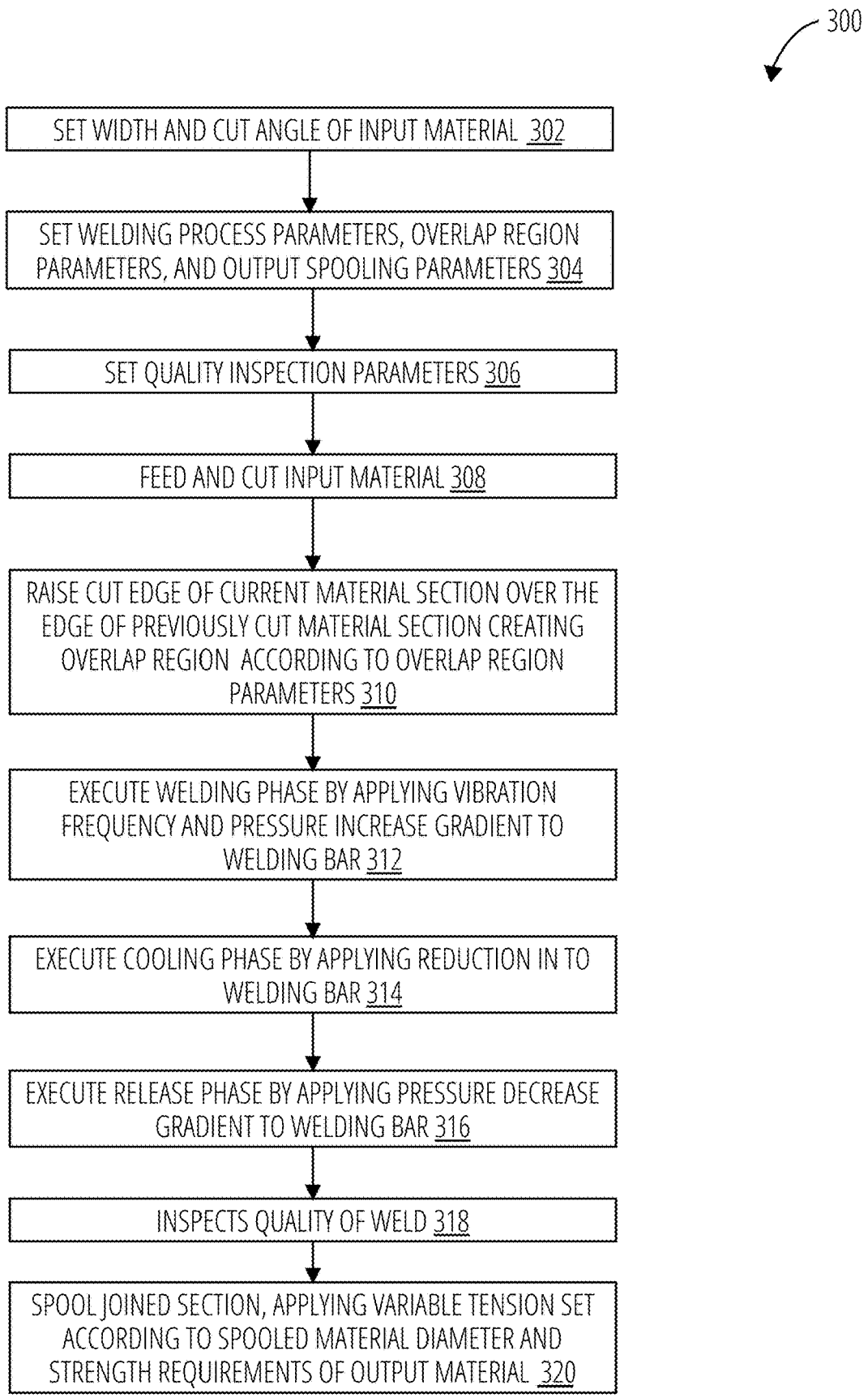
FIG. 3 illustrates an embodiment of a process 300 of operating a control system.

Referencing FIG. 3, a process 300 of operating a control system involves setting the width of the cut angle of the input material for the input material feeder (block 302). In block 304, the process 300 sets welding process parameters and overlap region parameters for the welding bar, and output spooling parameters for the output material spooler. In block 306, the process 300 sets quality inspection parameters, to configure the control system 122 on how to interpret readings from the quality monitoring device 128, and in some embodiments to set an algorithm for quality control/inspection according to quality control settings for the particular process.

In block 308, the process 300 feeds and cuts input material through operation of the material cutter. In block 310, the process 200 raises the cut edge of the current material section over the edge of previously cut material section creating an overlap region according to the overlap region parameters.

In block 312, the process 300 executes a welding phase by applying a vibration frequency and a pressure increase gradient to welding bar. In block 314, the process 300 executes a cooling phase by applying a cooling gradient from the weld-table surface. In block 316, the process 300 executes a release phase by applying a pressure decreasing gradient to welding bar.

In block 318, the process 300 inspects the quality of the weld. In block 320, the process 300 spools the joined sections together through the output material spooler and applies a variable tension set according to the spooled material diameter and the strength requirements of output material through operation of the configurable tensioning mechanism.

Figure 4:
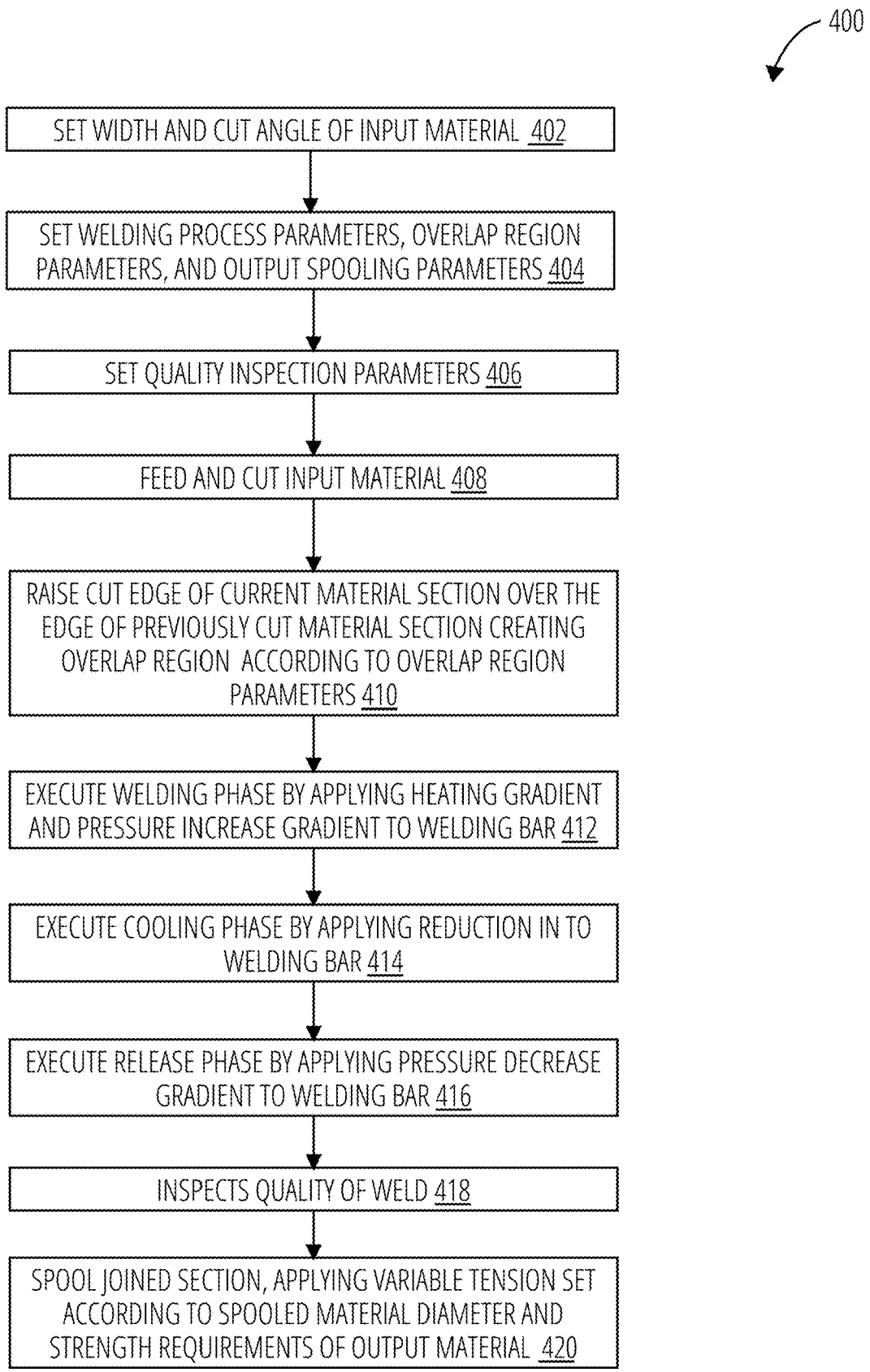
FIG. 4 illustrates an embodiment of a process 400 of operating a control system.

Referencing FIG. 4, a process 400 of operating a control system involves setting the width of the cut angle of the input material for the input material feeder (block 402). In block 404, the process 400 sets welding process parameters and overlap region parameters for the welding bar, and output spooling parameters for the output material spooler. In block 406, the process 400 sets quality inspection parameters, to configure the control system 122 on how to interpret readings from the quality monitoring device 128, and in some embodiments to set an algorithm for quality control/inspection according to quality control settings for the particular process.

In block 408, the process 400 feeds and cuts input material through operation of the material cutter. In block 410, the process 400 raises the cut edge of the current material section over the edge of previously cut material section creating an overlap region according to the overlap region parameters.

In block 412, the process 400 executes a welding phase by applying a heating gradient and a pressure increase gradient to welding bar. In block 414, the process 400 executes a cooling phase by applying a cooling gradient from the weld-table surface. In block 416, the process 400 executes a release phase by applying a pressure decreasing gradient to welding bar.

In block 418, the process 400 inspects the quality of the weld. In block 420, the process 400 spools the joined sections together through the output material spooler and applies a variable tension set according to the spooled material diameter and the strength requirements of output material through operation of the configurable tensioning mechanism.

Figure 5:
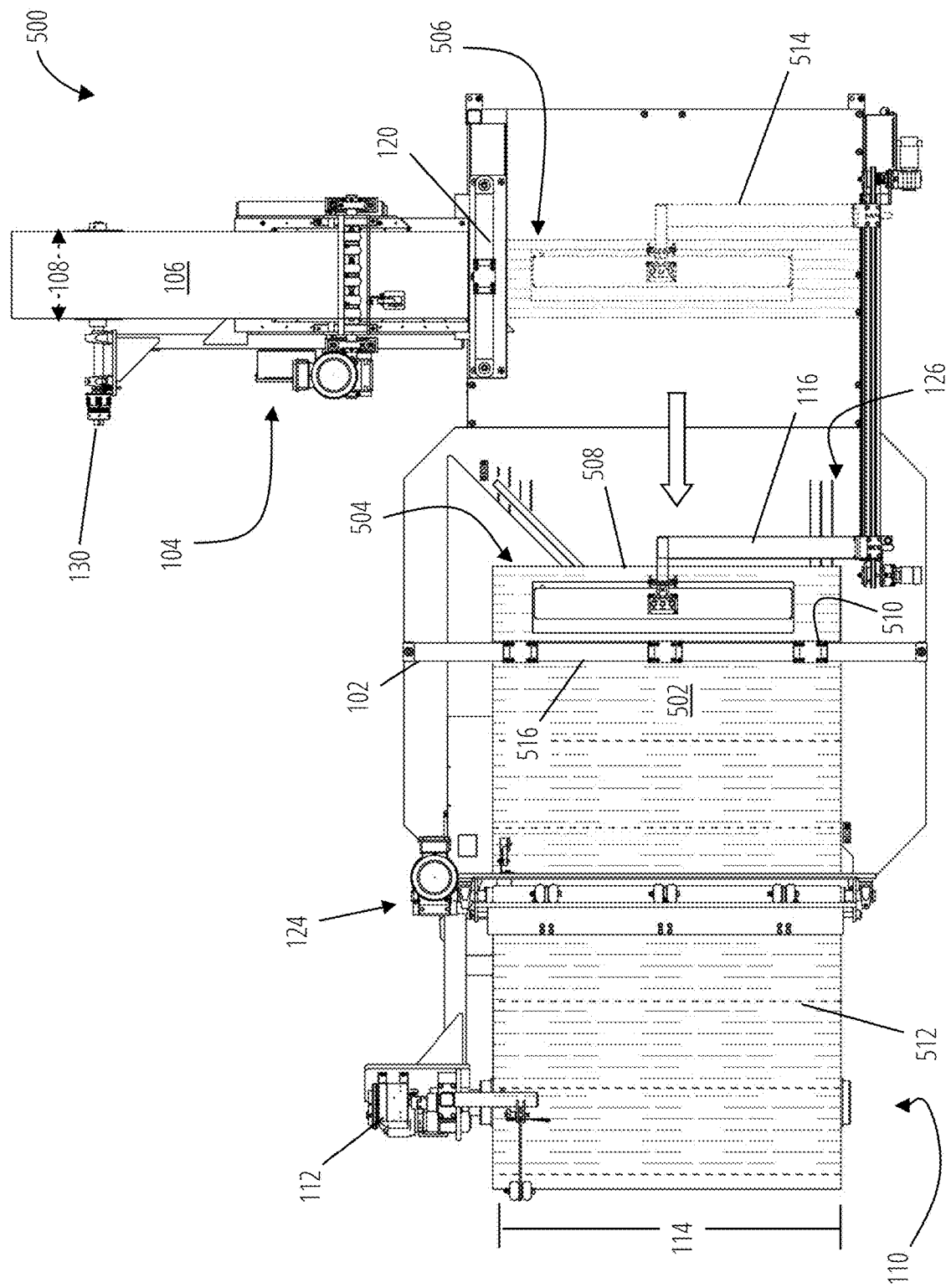
FIG. 5 illustrates an embodiment of a system 500 to re-configure an input material into an output material through a butt weld.

Referencing FIG. 5, a system 500 to re-configure an input material into an output material includes a welder 102, an input material feeder 104, an output material spooler 110, a positioning and alignment system 116, a force-feedback mechanism 118, a material cutter 120, a control system, a zoned vacuum hold-down table 126, and a weld material wind up and weld positioner 124. In the system 500, the welder 102 may be accomplished by a thermal welder. The zoned vacuum hold-down table 126 may be provided a functions to retain and cool the portions of material that are being joined. The input material feeder 104 comprises a first configurable tensioning mechanism 130, and receives an input material 106 having a first width 108. The output material spooler 110 comprises a second configurable tensioning mechanism 112, and collects an output material having a second width 114 and comprising a plurality of welded seams 512.

The system 500 illustrates a first intermediate cut section of material 506 being fed through the the material cutter 120 and retained by the positioning and alignment system 514. The first configurable tensioning mechanism 130 maintain the tension while the positioning and alignment system 514 holds the first intermediate cut section of material 504 and the material cutter 120 slices the material. The positioning of the input material feeder 104 to the material cutter 120 results in a horizontal cut angle for the first intermediate cut section of material. After the material cutter 120 cuts the first intermediate cut section of material 506, the positioning and alignment system 116 positions the leading edge 510 of the first intermediate cut section of material 504 to contact the trailing edge 516 of the second intermediate cut section of material 502 underneath the welder 102. The first intermediate cut section of material 504 is abutted against the second intermediate cut section of material 502 through operation of the positioning and alignment system 116. The zoned vacuum hold-down table 126 may retain the table while the welder joins the two pieces of material as well as provide an exhaust route to pull heat away from the heat generated by the welder 102.

Figure 10:
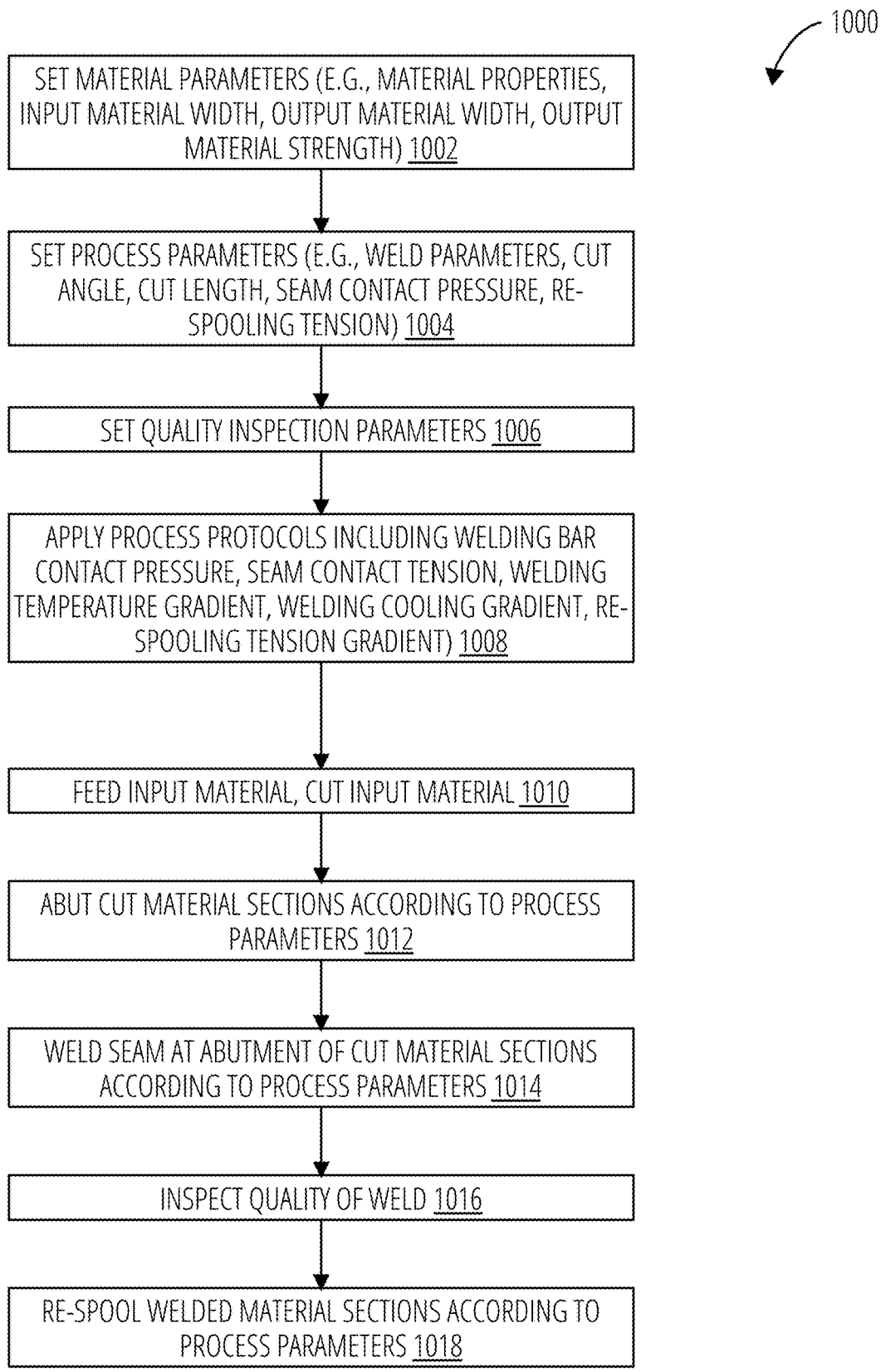
FIG. 10 illustrates an embodiment of a process 1000 of operating the control system.
Figure 13:
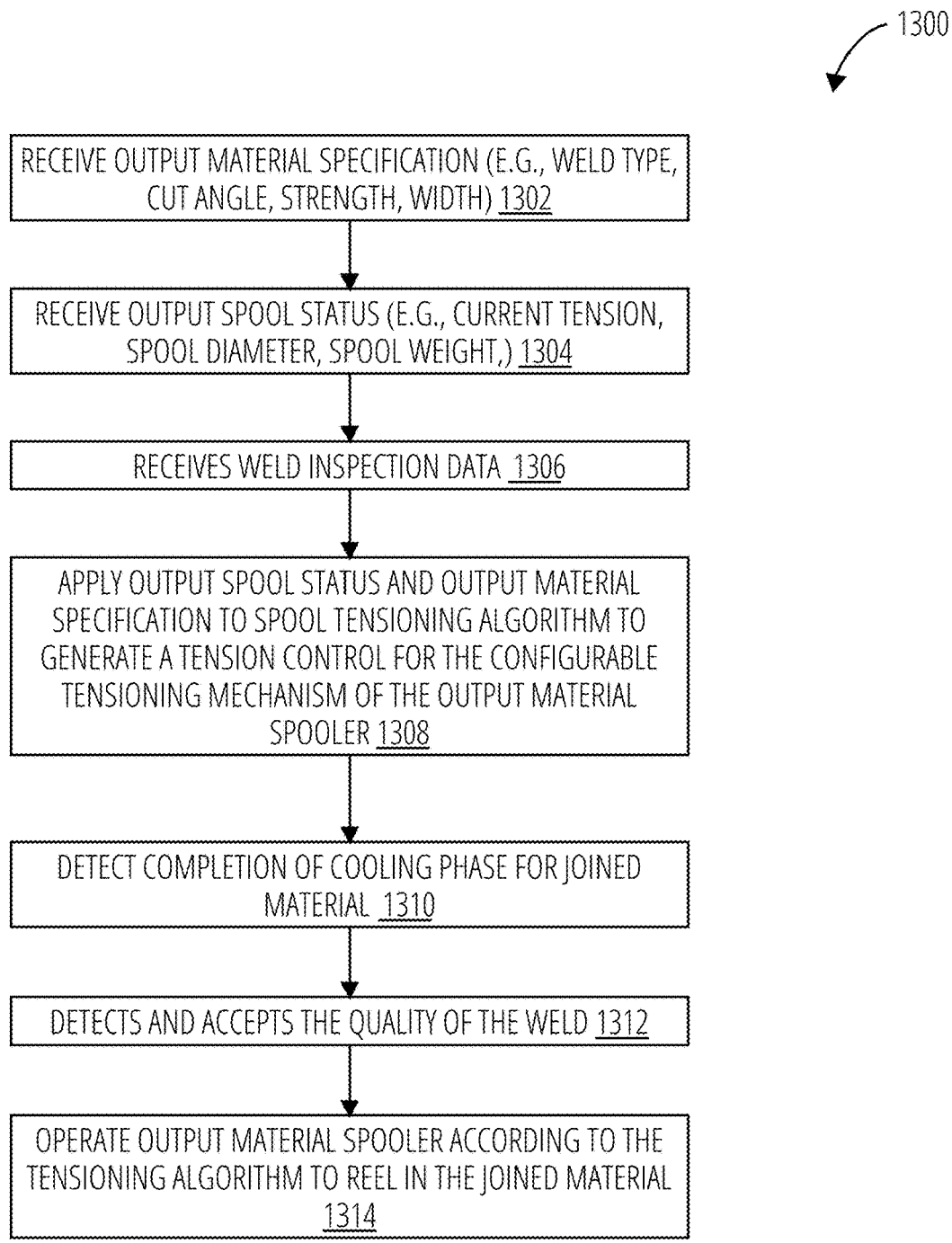
FIG. 13 illustrates an embodiment of a process 1300 for setting the tension for the output material spooler.

The system 500 may be operated in accordance with the process described in FIG. 2, FIG. 10, and FIG. 13.

Figure 6:
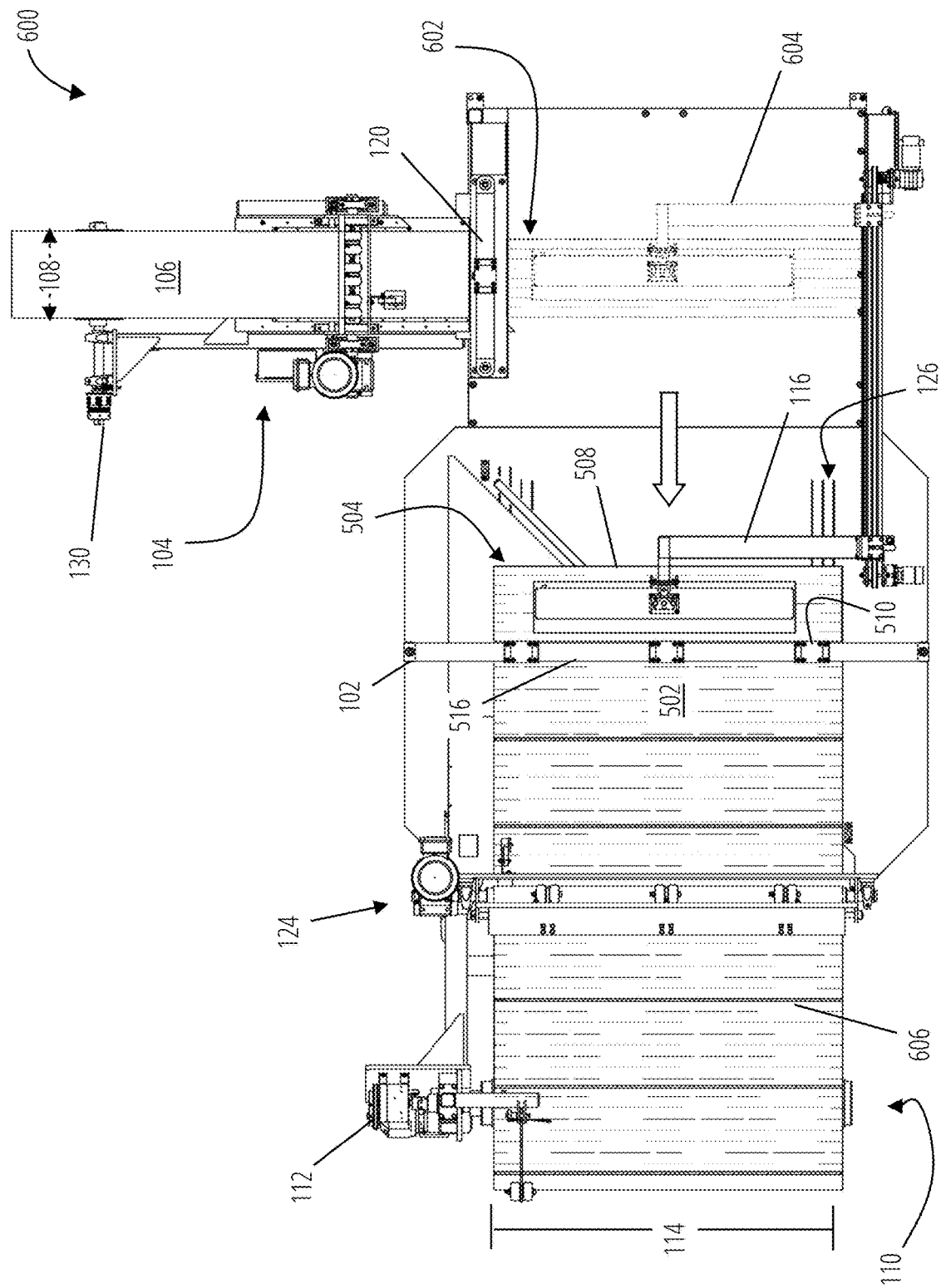
FIG. 6 illustrates an embodiment of a system 600 to re-configure an input material into an output material through a lap weld.

Referencing FIG. 6, a system 600 to re-configure an input material into an output material includes a welder 102, an input material feeder 104, an output material spooler 110, a positioning and alignment system 116, a force-feedback mechanism 118, a material cutter 120, a control system, a zoned vacuum hold-down table 126, and a weld material wind up and weld positioner 124. In the system 600, the welder 102 may be accomplished by an ultrasonic welder, the input material feeder 104 comprises a first configurable tensioning mechanism 130, and receives an input material 106 having a first width 108. The zoned vacuum hold-down table 126 may function to retain and cool the portions of material that are being joined. The output material spooler 110 comprises a second configurable tensioning mechanism 112, and collects an output material having a second width 114 and comprising a plurality of welded seams 512.

The system 600 illustrates a first intermediate cut section of material 602 being fed through the the material cutter 120 and retained by the positioning and alignment system 604. The positioning of the input material feeder 104 to the material cutter 120 results in a horizontal cut angle for the first intermediate cut section of material. The first configurable tensioning mechanism 130 maintains the tension while the positioning and alignment system 514 holds the first intermediate cut section of material 504 and the material cutter 120 slices the material. After the material cutter 120 cuts the first intermediate cut section of material 602, the positioning and alignment system 116 repositions the leading edge 510 of the first intermediate cut section of material 504 to overlap the trailing edge 516 of the second intermediate cut section of material 502 underneath the welder 102. The first intermediate cut section of material 504 overlaps the second intermediate cut section of material 502 through operation of the positioning and alignment system 116. During the welding processes, the positioning and alignment system 116 and the zoned vacuum hold-down table 126 may operate together to function as a holder mechanism to retain the first intermediate cut section of material 504 in its overlapping position to the second intermediate cut section of material 502.

The system 600 may be operated in accordance with the process described in FIG. 3, FIG. 4, and FIG. 11-FIG. 13.

Figure 7:
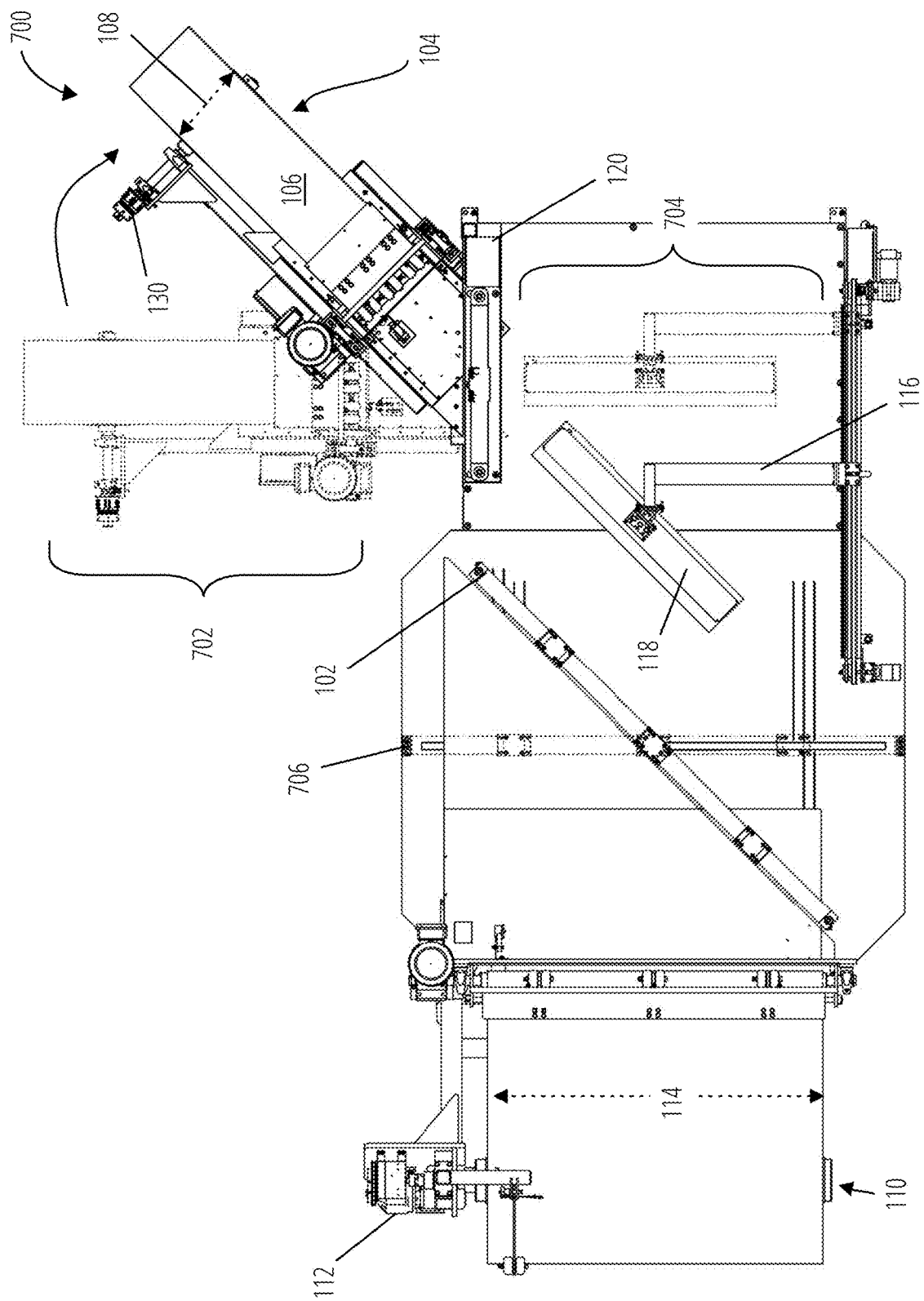
FIG. 7 illustrates an embodiment of a system 700 to re-configure an input material into an output material.

Referencing FIG. 7 a system 700 to re-configure an input material into an output material includes an input material feeder 104, a positioning and alignment system 116, a welder 102, an output material spooler 110, a zoned vacuum hold-down table 126, and a weld material wind up and weld positioner 124. The input material feeder 104 comprises a first configurable tensioning mechanism 130, and receives an input material 106 of a first width 108. The output material spooler 110 comprises a second configurable tensioning mechanism 112, and collects an output material having a second width 114.

The system 700 illustrates the repositioning of input material feeder 702, positioning and alignment system 704, and welder 706 from a horizontal configuration (relative to the output material) to an angled configuration as seen in the input material feeder 104, the welder 102, and the positioning and alignment system 116. The angled configuration of the system 700 illustrates the welder 102, the input material feeder 104, and the force-feedback mechanism 118 being angled to receive the input material 106 fed through the material cutter 120. The fed input material 106 forms a section of material with an angled cut. The section of material is received by the positioning and alignment system 116 which repositions the angled section of material to another angled section of material at the welder 102.

The system 700 may be operated in accordance with the process described in FIG. 2-FIG. 4, and FIG. 10-FIG. 13.

Figure 8:
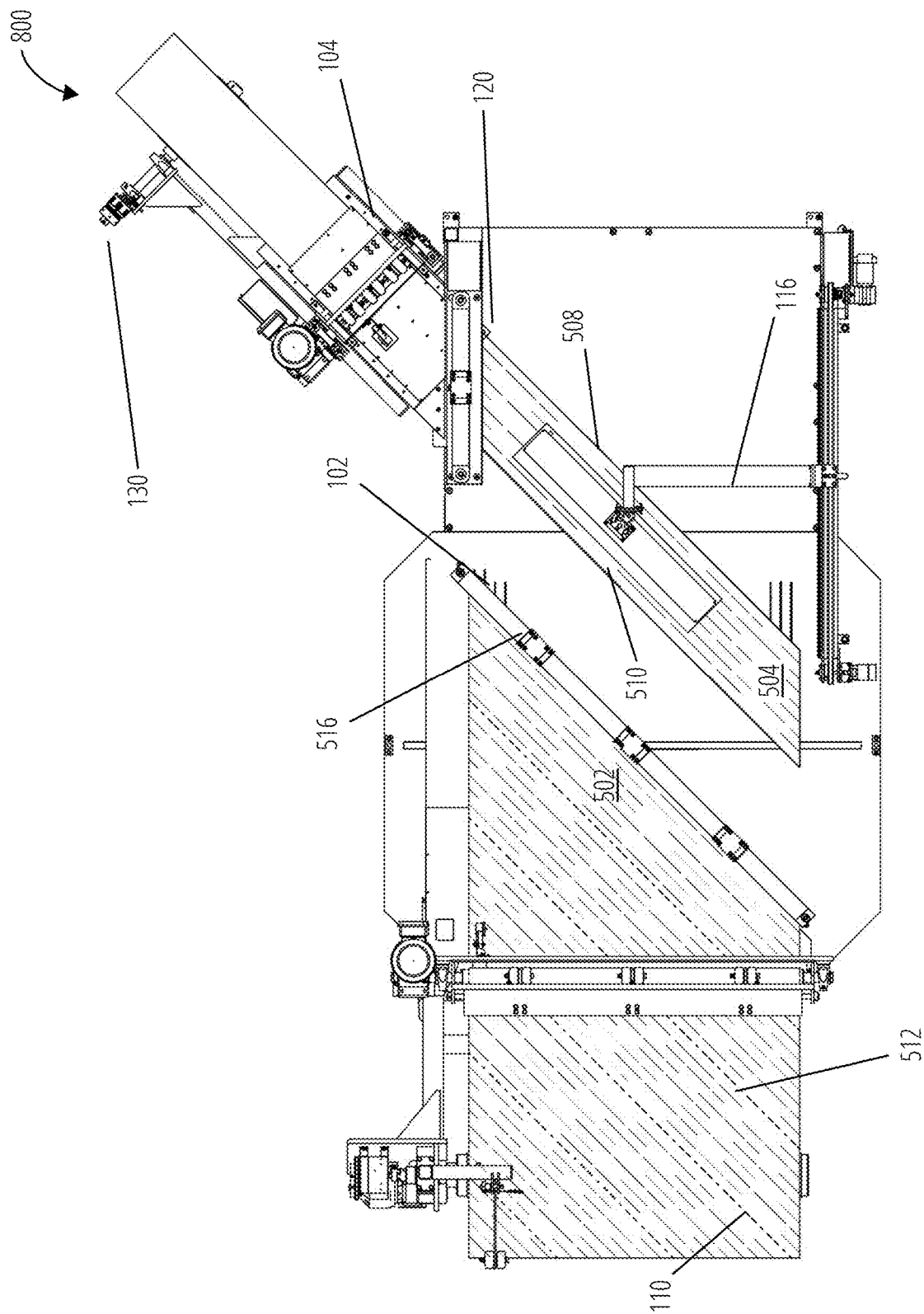
FIG. 8 illustrates an embodiment of a system 800 to re-configure an input material into an output material through a butt weld, repositioning the input material feeder 104, the positioning and alignment system 116, and the welder 102.

Referencing FIG. 8, a system 800 includes a welder 102, an input material feeder 104, a positioning and alignment system 116, and a material cutter 120. In the system 800, the welder may be accomplished by a thermal welder in order to create a butt weld joining the cut edges of material along their seam. The system 800 illustrates the welder 102, the input material feeder 104, and the positioning and alignment system 116 repositioned at an angle to the material cutter 120. The repositioning of the input material feeder 104 to the material cutter 120 changes the cut angle of the intermediate sections of material. The repositioning of the positioning and alignment system 116 allows for receiving and aligning the angled material. The repositioning of the welder 102 allows joining material section at an angle. The zoned vacuum hold-down table 126 allows for the retention of the tapes and cooling of welded seam 512 during and following the weld process. The feed angle of the input material feeder 104 changes the cut angle of the first intermediate cut section of material 504 configures the leading edge 510 and the trailing edge 508 with a slopping edge. The leading edge 510 of the first intermediate cut section of material 504 abutts the trailing edge 516 of the second intermediate cut section of material 502 underneath the welder 102. The output material spooler 110 reels in an output material with an angled welded seam 512.

The system 800 may be operated in accordance with the process described in FIG. 2, FIG. 10, and FIG. 13.

Figure 9:
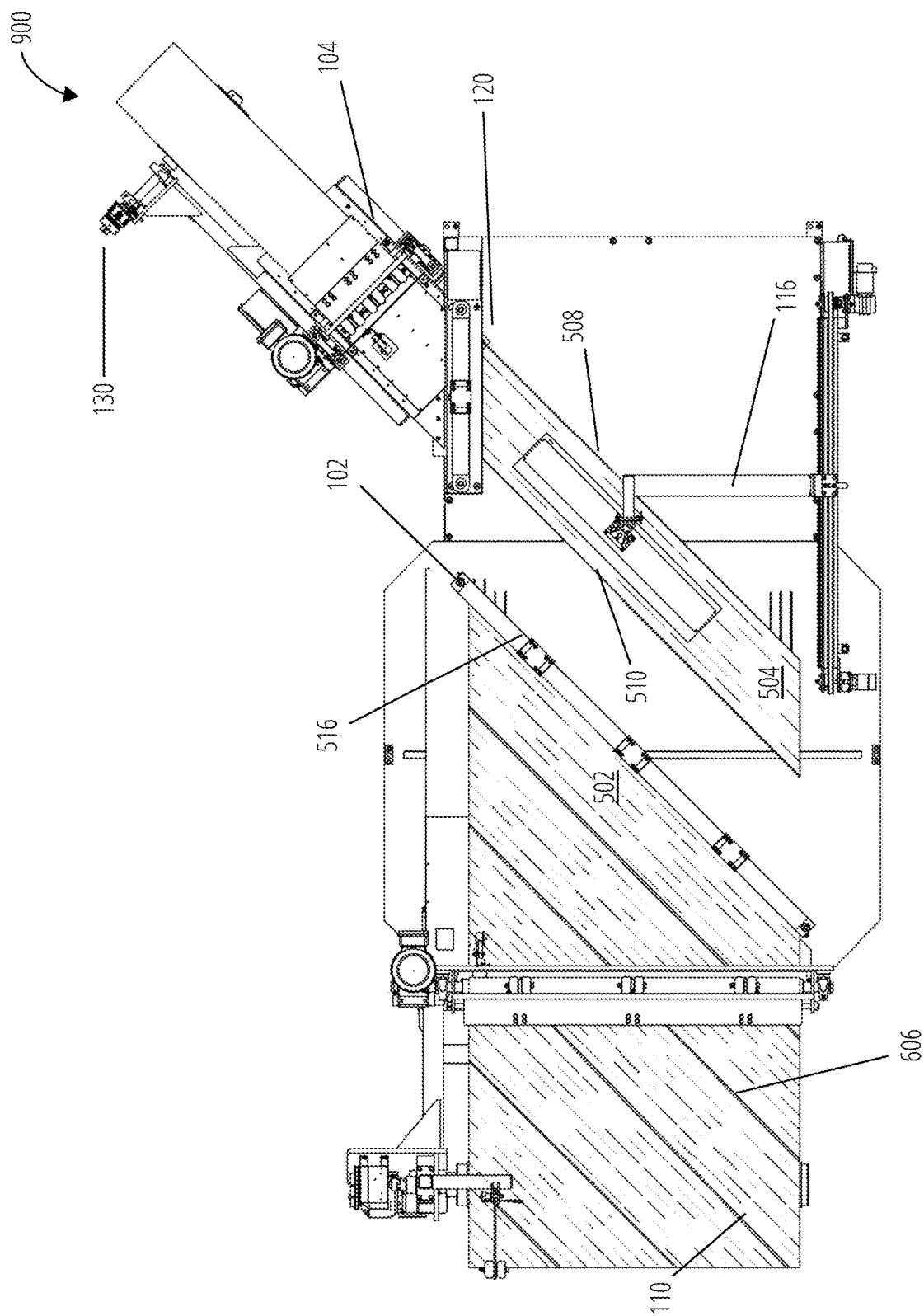
FIG. 9 illustrates an embodiment of a system 900 to re-configure an input material into an output material through a lap weld, repositioning the input material feeder 104, the positioning and alignment system 116, and the welder 102.

Referencing FIG. 9, a system 900 includes a welder 102, an input material feeder 104, a positioning and alignment system 116, and a material cutter 120. In the system 900, the welder 102 may be accomplished by an ultrasonic welder. The system 900 illustrates the welder 102, the input material feeder 104, and the positioning and alignment system 116 repositioned at an angle to the material cutter 120. The repositioning of the input material feeder 104 to the material cutter 120 changes the cut angle of the intermediate sections of material. The repositioning of the positioning and alignment system 116 allows for receiving and aligning the angled material. The repositioning of the welder 102 allows joining material section at an angle. The zoned vacuum hold-down table 126 allows for the retention of the tapes and cooling of the welded overlap 606 during and following the weld process. The feed angle of the input material feeder 104 changes the cut angle of the first intermediate cut section of material 504 configures the leading edge 510 and the trailing edge 508 with a slopping edge. The leading edge 510 of the first intermediate cut section of material 504 overlaps the trailing edge 516 of the second intermediate cut section of material 502 underneath the welder 102. The output material spooler 110 reels in an output material with an angled welded seam 512.

The system 900 may be operated in accordance with the process described in FIG. 3, FIG. 11, FIG. 12, and FIG. 13.

Referencing FIG. 10, a process 1000 of operating the control system involves setting material parameters (e.g., material properties, input material width, output material width, output material strength) for the input material in the input material feeder (block 1002). In block 1004, the process 1000 sets process parameters (e.g., weld parameters, cut angle, cut length, seam contact pressure, re-spooling tension). In block 1006, the process 1000 sets quality inspection parameters.

In block 1008, the process 1000 applies process protocols including welding bar contact pressure, seam contact tension, welding temperature gradient, welding cooling gradient, re-spooling tension gradient). In block 1010, the process 1000 feeds input material through the material cutter and cuts input material into a intermediate section of material. In block 1012, the process 1000 abuts the cut material sections according to process parameters through operation of the positioning and alignment system.

In block 1014, the process 1000 welds a seam at the abutment of cut material sections through the welding bar, according to process parameters. In block 1016, the process 1000 inspects quality of the weld. In block 1018, the process 1000 re-spools the welded material sections through the output material spooler according to process parameters.

Figure 11:
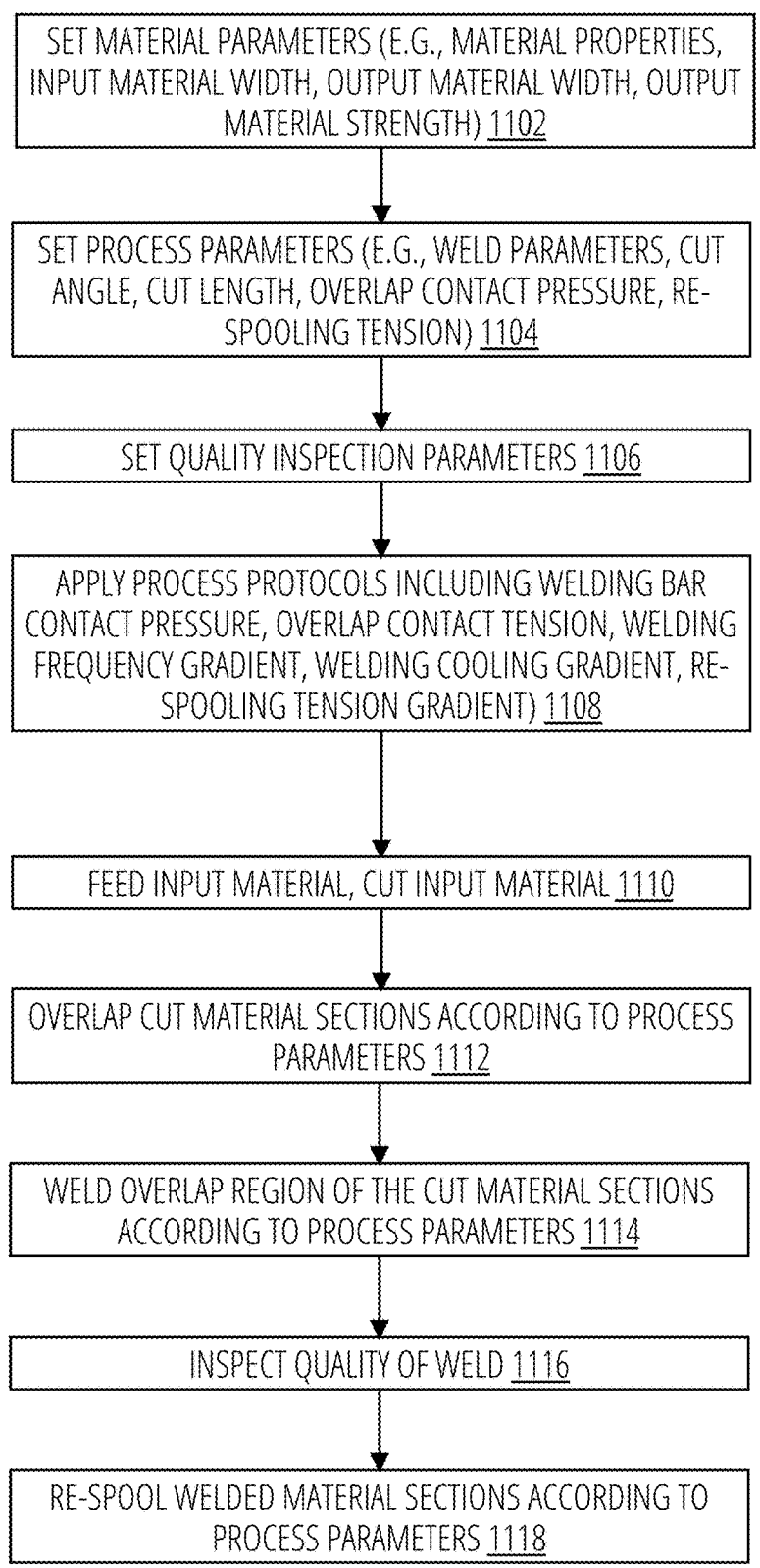
FIG. 11 illustrates an embodiment of a process 1100 of operating the control system.

Referencing FIG. 11, a process 1100 of operating the control system involves setting material parameters (e.g., material properties, input material width, output material width, output material strength) for the input material in the input material feeder (block 1102). In block 1104, the process 1100 sets process parameters (e.g., weld parameters, cut angle, cut length, overlap contact pressure, re-spooling tension). In block 1106, the process 1100 sets quality inspection parameters.

In block 1108, the process 1100 applies process protocols including welding bar contact pressure, overlap contact tension, welding frequency gradient, welding cooling gradient, re-spooling tension gradient). In block 1110, the process 1100 feeds input material through the material cutter and cuts input material into a intermediate section of material. In block 1112, the process 1100 overlaps the cut material sections according to process parameters through operation of the positioning and alignment system.

In block 1114, the process 1100 welds overlap region of the cut material sections through the welding bar, according to process parameters. In block 1116, the process 1100 inspects quality of the weld. In block 1118, the process 1100 re-spools the welded material sections through the output material spooler according to process parameters.

Figure 12:
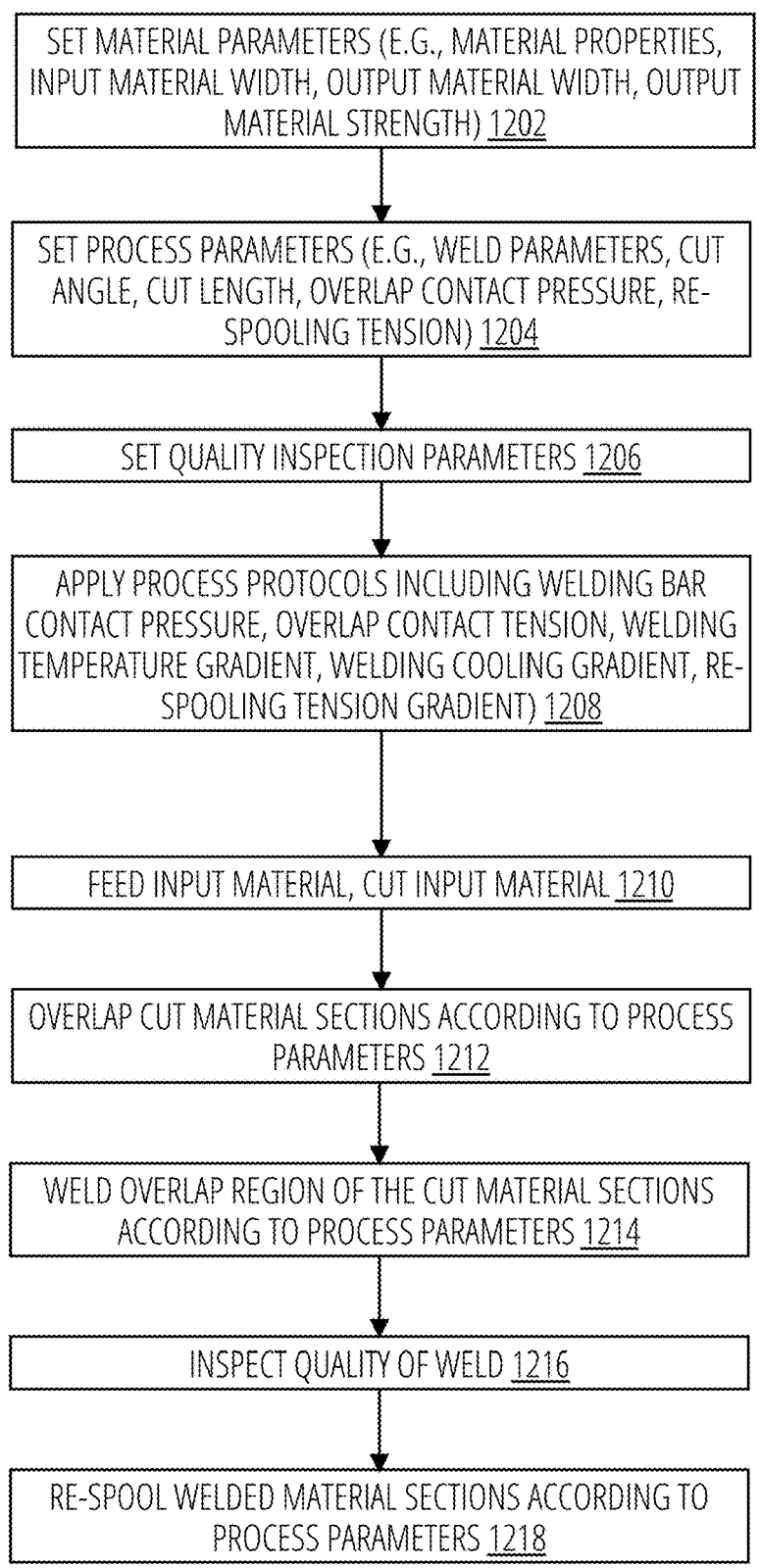
FIG. 12 illustrates an embodiment of a process 1200 of operating the control system.

Referencing FIG. 12, a process 1100 of operating the control system involves setting material parameters (e.g., material properties, input material width, output material width, output material strength) for the input material in the input material feeder (block 1202). In block 1204, the process 1100 sets process parameters (e.g., weld parameters, cut angle, cut length, overlap contact pressure, re-spooling tension). In block 1206, the process 1100 sets quality inspection parameters.

In block 1208, the process 1100 applies process protocols including welding bar contact pressure, overlap contact tension, welding temperature gradient, welding cooling gradient, re-spooling tension gradient). In block 1210, the process 1100 feeds input material through the material cutter and cuts input material into intermediate sections of material. In block 1212, the process 1100 overlaps the cut material sections according to process parameters through operation of the positioning and alignment system.

In block 1214, the process 1100 welds overlap region of the cut material sections through the welding bar, according to process parameters. In block 1216, the process 1100 inspects quality of the weld. In block 1218, the process 1100 re-spools the welded material sections through the output material spooler according to process parameters.

Referencing FIG. 13, a process 1300 for setting the tension for the output material spooler at block 1302 receives output material specification (e.g., weld type, cut angle, strength, width, length, etc.). In block 1304, the process 1300 receives the output spool status (e.g., current tension, spool diameter, spool weight) for the output material spooler. In block 1306, the process 1300 receives weld inspection data. In block 1308, the process 1300 applies the output spool status and the output material specification as parameters to a spool tensioning algorithm to generate a tension control.

In block 1310, the process 1300 detects completion of the cooling phase for the joined material. In block 1312, the process 1300 detects and accepts the quality of the weld. In block 1314, the process 1300 operates the output material spooler to reel in the joined material according to the tensioning algorithm.

Figure 14:
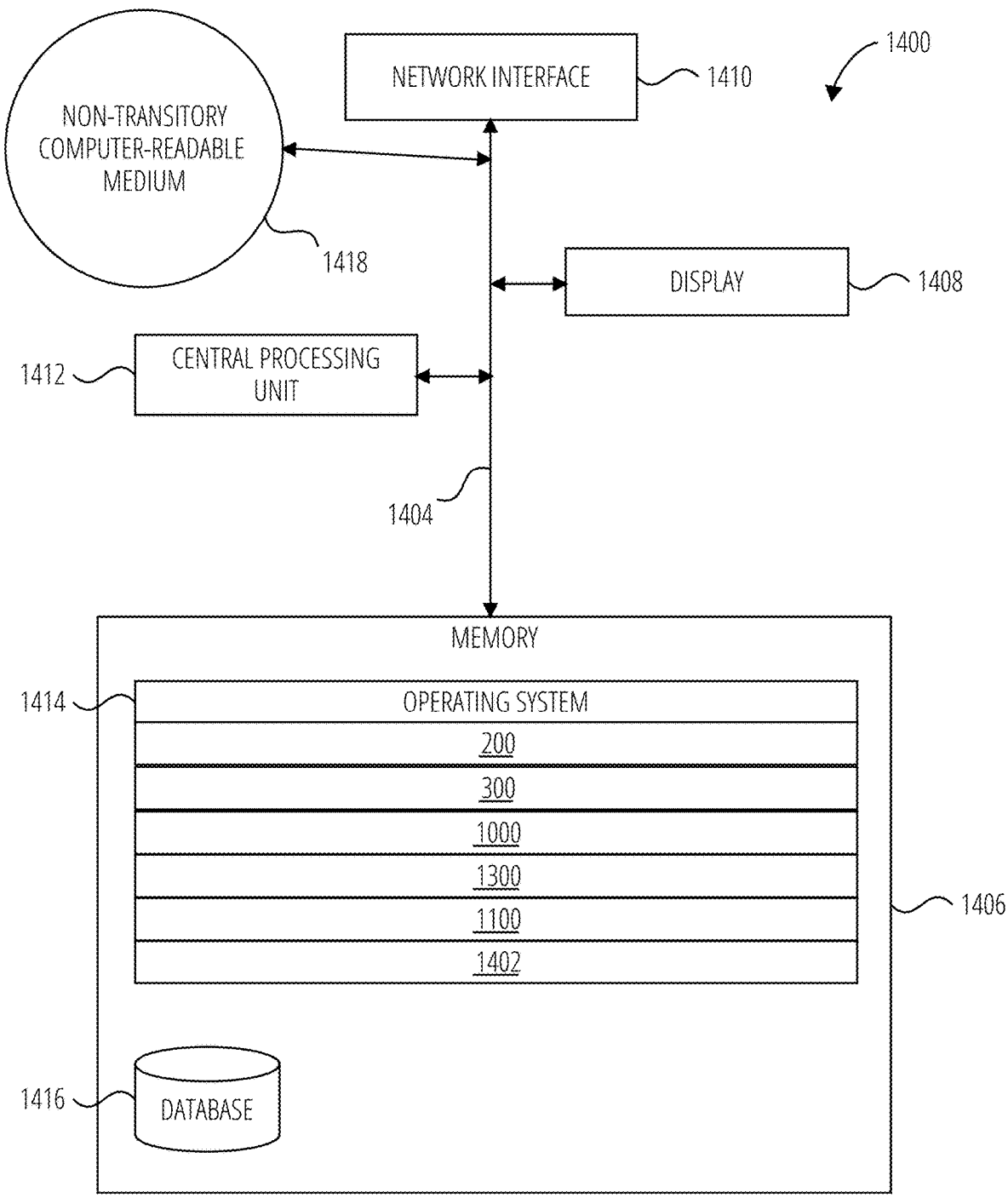
FIG. 14 illustrates a system 1400 in accordance with one embodiment.

FIG. 14 illustrates several components of an exemplary system 1400 in accordance with one embodiment. In various embodiments, system 1400 may include a desktop PC, server, workstation, mobile phone, laptop, tablet, set-top box, appliance, or other computing device that is capable of performing operations such as those described herein. In some embodiments, system 1400 may include many more components than those shown in FIG. 14. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1400 may comprise one or more physical and/or logical devices that collectively provide the functionalities described herein. In some embodiments, system 1400 may comprise one or more replicated and/or distributed physical or logical devices.

In some embodiments, system 1400 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1400 includes a bus 1404 interconnecting several components including a network interface 1410, a display 1408, a central processing unit 1412, and a memory 1406.

Memory 1406 generally comprises a random access memory ("RAM") and permanent non-transitory mass storage device, such as a hard disk drive or solid-state drive. Memory 1406 stores an operating system 1414. In some embodiments, the memory 1406 stores logic for operating process 200, process 300, process 1000, process 1300, process 1100, and process 1402.

These and other software components may be loaded into memory 1406 of system 1400 using a drive mechanism (not shown) associated with a non-transitory computer-readable medium 1418, such as a floppy disc, material, DVD/CD-ROM drive, memory card, or the like.

Memory 1406 also includes database 1416. In some embodiments, system 1400 may communicate with database 1416 via network interface 1410, a storage area network ("SAN"), a high-speed serial bus, and/or via the other suitable communication technology. The database 1416 may include process parameters, quality control settings, and other configuration settings described herein.

In some embodiments, database 1416 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A system to re-configure an input material of a first width into an output material of a second width that may be different that the first width, the system comprising:
    an input material feeder to receive and feed the input material;
    an output material spooler reconfigurable to accept and feed the output material;
    a material cutter positioned between the input material feeder and the output material spooler, the input material feeder re-configurable relative to the material cutter to cut the input material at a re-configurable cut angle to produce a first intermediate cut section of material;
    a positioning and alignment system to position and align a leading edge of the first intermediate cut section of material with a trailing edge of a second intermediate cut section of material, the second intermediate cut section of material cut immediately prior to the first intermediate cut section of material;
    a welder having a configurable position to weld the first intermediate cut section of material to the second intermediate cut section of material;
    a weld-table surface configured to control cooling immediately beneath the welder; and
    a control system comprising logic to set at least an intensity of the welder, a contact pressure of the welder, temperature of the weld-table surface, and a tension applied by the output material spooler.

2. The system of claim 1, wherein the welder is a thermal welder.

3. The system of claim 1, wherein the welder is an ultrasonic welder.

4. The system of claim 1, wherein the input material is a continuous fiber reinforced thermoplastic (CFRT) tape.

5. The system of claim 1, wherein the input material is a semi-preg or pre-preg fabric.

6. The system of claim 1, wherein further comprising a quality monitoring device comprising one or more of machine vision, optical scanning, and transducers to monitor a quality of the output material and to detect defects in the output material.

7. The system of claim 6, wherein the control system further comprising logic to set an algorithm for interpreting quality control readings from the quality monitoring device.

8. The system of claim 1 wherein the control system further comprising logic to set one or more of an intensity of the welder, a duration of cooling of the welder, a duration of weld contact of the welder, and a process line rate for conversion of the input material to the output material.

9. The system of claim 1, wherein the input material feeder and the material cutter being distinct and separable from the positioning and alignment system, the welder, and the output material spooler.

10. A system to re-configure an input material of a first width into an output material of a second width that may be the same or different than the first width, the system comprising:
    an input material feeder to accept and feed the input material;
    an output material spooler reconfigurable to accept and feed the output material;
    a material cutter positioned between the input material feeder and the output material spooler, the input material feeder re-configurable relative to the material cutter to cut the input material at a re-configurable cut angle to produce a first intermediate cut section of material;
    a positioning and alignment system to position and align a leading edge of the first intermediate cut section of material with a trailing edge of a second intermediate cut section of material, the second intermediate cut section of material cut immediately prior to the first intermediate cut section of material;
    the positioning and alignment system comprising force-feedback to precisely set a contact pressure between an edge of the first intermediate cut section of material and an edge of the second intermediate cut section of material;
    a thermal welder having a configurable position to weld the first intermediate cut section of material to the second intermediate cut section of material along the cut angle;
    a weld-table surface configured to control cooling immediately beneath the thermal welder; and
    a control system comprising logic to set at least a heating and cooling temperature of the thermal welder, the contact pressure of the thermal welder, temperature of the weld-table surface, and a tension applied by the output material spooler.

11. The system of claim 10, wherein the input material is a continuous fiber reinforced thermoplastic (CFRT) tape.

12. The system of claim 10, wherein further comprising a quality monitoring device comprising one or more of machine vision, optical scanning, and transducers to monitor a quality of the output material and to detect defects in the output material.

13. The system of claim 12, wherein the control system further comprising logic to set an algorithm for interpreting quality control readings from the quality monitoring device.

14. The system of claim 10, wherein the control system further comprising logic to set one or more of a duration of heating the thermal welder, a duration of cooling of the thermal welder, a duration of weld contact of the thermal welder, and a process line rate for conversion of the input material to the output material.

15. The system of claim 10, wherein the input material feeder and the material cutter being distinct and separable from the positioning and alignment system, the thermal welder, and the output material spooler.

16. A system to re-configure an input material of a first width into an output material of a second width the same as or different from the first width, the system comprising:
an input material feeder reconfigurable to accept and feed the input material;
an output material spooler reconfigurable to accept and feed the output material;
a material cutter positioned between the input material feeder and the output material spooler, the input material feeder re-configurable relative to the material cutter to cut the input material at a re-configurable cut angle to produce a first intermediate cut section of material;
a positioning and alignment system to position and align a leading edge of the first intermediate cut section of material to overlap a trailing edge of a second intermediate cut section of material, the second intermediate cut section of material cut immediately prior to the first intermediate cut section of material;
the positioning and alignment system comprising a programmable overlap position to raise and move the leading edge of the first intermediate cut section of material over the trailing edge of the second intermediate cut section of material to a set travel distance between an edge of the first intermediate cut section of material and an edge of the second intermediate cut section of material;
a welder having a configurable position to weld the first intermediate cut section of material to the second intermediate cut section of material;
a holder to secure the overlap of the first intermediate cut section of material with the second intermediate cut section of material in position and orientation while they are being welded;
a weld-table surface configured to control cooling immediately beneath the welder; and
a control system comprising logic to set at least an intensity of the welder, a contact pressure of the welder, temperature of the weld-table surface, and a tension applied by the output material spooler.

17. The system of claim 16 further comprising:
the welder being an ultrasonic welder having a configurable position to weld the first intermediate cut section of material to the second intermediate cut section of material along the overlap between the leading edge of the first intermediate cut section of material and the trailing edge of the second intermediate cut section of material; and
the control system comprising logic to set at least a frequency for the ultrasonic welder, the contact pressure of the ultrasonic welder, temperature of the weld-table surface, and a tension applied by the output material spooler.

18. The system of claim 17, wherein the control system further comprising logic to set one or more of a duration of applied frequencies for the ultrasonic welder, a duration of weld contact of the ultrasonic welder, and a process line rate for conversion of the input material to the output material.

19. The system of claim 16 further comprising:
the welder being a thermal welder having a configurable position to weld the first intermediate cut section of material to the second intermediate cut section of material along overlap between the leading edge of the first intermediate cut section of material and the trailing edge of the second intermediate cut section of material; and
the control system comprising logic to set at least a heating and cooling temperature of the thermal welder, the contact pressure of the thermal welder, temperature of the weld-table surface, and a tension applied by the output material spooler.

20. The system of claim 19, wherein the control system further comprising logic to set one or more of a duration of heating the thermal welder, a duration of cooling of the thermal welder, a duration of weld contact of the thermal welder, and a process line rate for conversion of the input material to the output material.

* * * * *